Figure 1:
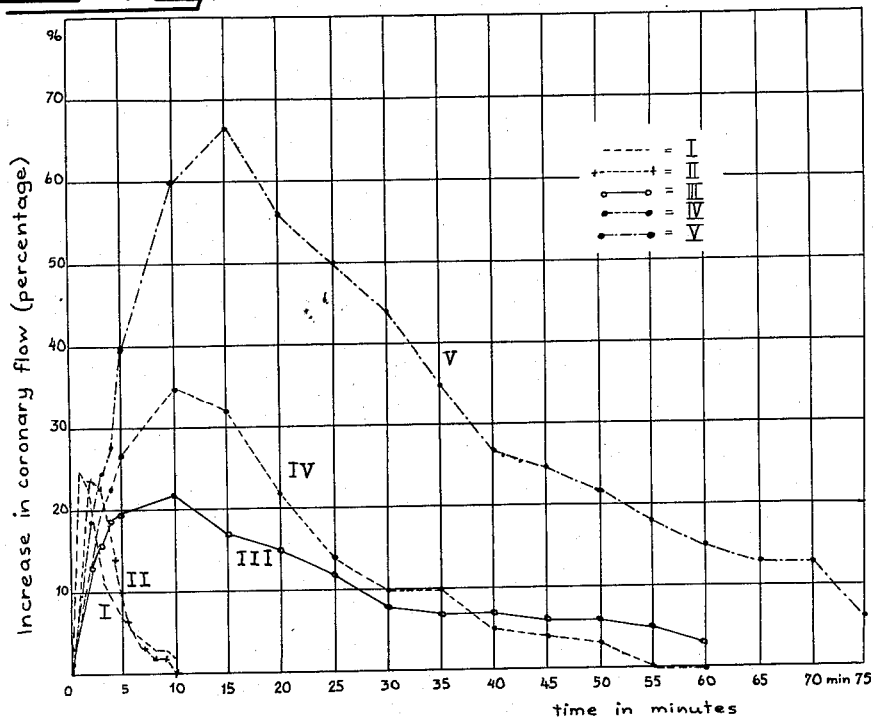

March 29, 1966  H. RITTER ETAL  3,243,442
7-HYDROXY COUMARIN DERIVATIVES
Original Filed July 26, 1962

INVENTOR.
HEINRICH RITTER
RUDI BEYERLE
BY ROLF-EBERHARD NITZ

FRANCIS M. CRAWFORD

United States Patent Office 3,243,442
Patented Mar. 29, 1966

3,243,442
7-HYDROXY COUMARIN DERIVATIVES
Heinrich Ritter, Dornigheim, Kreis Hanau, and Rudi Beyerle and Rolf-Eberhard Nitz, Frankfurt am Main-Fechenheim, Germany, assignors to Cassella Farbwerke Mainkur Aktiengesellschaft, Frankfurt am Main-Fechenheim, Germany
Original application July 26, 1962, Ser. No. 212,657. Divided and this application May 5, 1964, Ser. No. 368,757
9 Claims. (Cl. 260—343.2)

This application is a division of parent application Ser. No. 212,657, filed July 26, 1962, and is entitled to the same priority dates claimed in said parent application.

The administration of coronary vasodilators is to bring about an enhanced blood flow in the coronary vessels. The conventional coronary vasodilators, however, involve the disadvantage of exercising merely a non-specific vasodilator action on the coronary vessels because they simultaneously cause a dilatation of other large blood vessel, areas, which is symptomatic of a considerable decrease in blood pressure. This hypotension does not allow the use of the known coronary vasodilators in hypotonic patients and in those having an acute myocardial infarction. In such cases the known agents may even evoke a paradoxical effect on the coronary vessels, namely a coronary blood flow decreasing effect (see Scheler and Bretschneider, Verhandlungen der deutschen Gesellschaft für Kreislaufforschung, vol. 26, page 254 (1960)). Moreover, the known coronary vasodilators have only a relatively short-term action. Consequently, the objective of our interest has been directed to the development of such coronary vasodilators as specifically dilate the coronary vessels only and, thus, do not exhibit a hypotensive action and which especially possess a long-term activity.

Now, we have found that the desired properties inhere in the derivatives of the 7-hydroxy-coumarins of the general formula

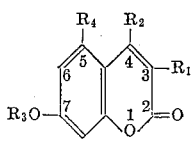

wherein $R_1$ is a substituent of the group consisting of a hydrogen atom, an alkyl-, alkenyl-, aryl-, aralkyl-, heteroalkyl-, aminoalkyl- and a carbalkoxyalkyl radical, $R_2$ is a substituent of the group consisting of an alkyl- and aryl residue, $R_3$ is a substituent of the group consisting of an alkenyl-, carbalkoxyalkyl-, carboxyalkyl-, carbamidoalkyl radical and, if $R_1$ is an aminoalkyl radical, furthermore an alkyl radical and $R_4$ is a substituent of the group consisting of a hydrogen atom and the residue $-OR_3$.

The new 7-hydroxy-coumarin derivatives are obtained in the known methods by allowing 7-hydroxy-coumarins of the general formula

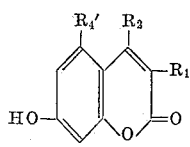

wherein $R_4'$ is a hydrogen atom of a hydroxyl group, to react with halogen compounds of the formula $R_3Hal$, in the presence of an acid-binding agent, or by condensing with cyclization substituted hydroxy-cinnamic acids of the general formula

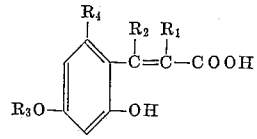

or their functional derivatives or by condensing oxybenzenes of the general formula

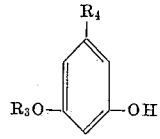

with β-keto-acid esters of the general formula

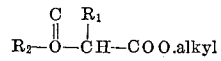

or, if $R_3$ has the meaning of a carbamido-alkyl radical, by aminating 7-hydroxy-coumarin derivatives of the general formula

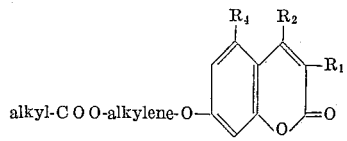

with ammonia or primary or secondary amines.

The 7-hydroxy-coumarins being required, interalia, as starting products may be obtained according to known methods, by condensing in the presence of an acid condensation agent β-keto-acid esters of the general formula

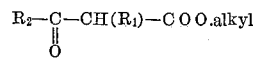

being correspondingly substituted with hydroxybenzenes of the general formula

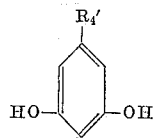

Following the pharmacological tests in laboratories, which are described hereinafter the most active derivatives of the 7-hydroxy-coumarines had been subjected to clinical experimentation, the results of which will also be stated hereinafter.

The pharmacological investigation of the substances according to our present invention with respect to their coronary vasodilator action was carried out in dogs according to the method disclosed by Eckenhoff, Hafkenschiel and Landmesser (Am. J. Physiol. 148, 582 (1947)). The test preparations were applied intravenously to the animals narcotized. The coronary blood flow was measured by means of an automatic Bubble-Flow-Meter and the blood pressure was measured in the femoral artery by means of an Anderson-Glass-Capsule Manometer. During the test period the animals were given artificial respiration. On these test conditions the dilatation of the coronary artery being caused by the test substance, gives rise to a more rapid bubble flow, whereas a constriction of the coronary vessels becomes evident from a retardation of the bubble flow, which is recorded by a kymograph. In all these tests there was used papaverine as a comparative standard substance.

Figure 2:
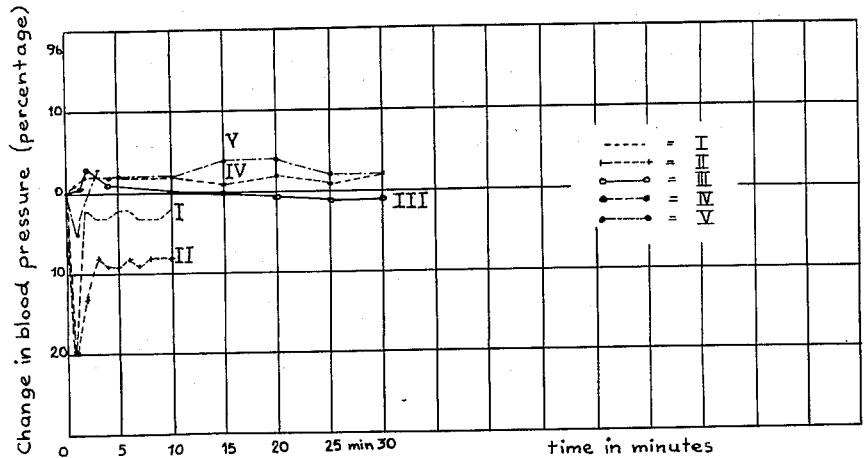

FIGURES 1 and 2 illustrate graphically the results obtained when using different amounts of papaverine in comparison to 3-β-diethylaminoethyl-4-methyl-coumarin-7-ethyl oxyacetate chlorhydrate.

Within each figure

Curve I represents the action of 0.4 mg./kg. papaverine,
Curve II represents the action of 0.8 mg./kg. papaverine,
Curve III represents the action of 0.8 mg./kg. 3-β-diethyl-aminoethyl - 4 - methyl - coumarin - 7-ethyl oxyacetate chlorhydrate,
Curve IV represents the action of 1.265 mg./kg. 3-β-diethylaminoethyl - 4 - methyl-coumarin-7-ethyl oxyacetate chlorhydrate,
Curve V represents the action of 2 mg./kg. 3-β-diethylaminoethyl-4-methyl-coumarin-7-ethyl oxyacetate chlorhydrate.

FIGURE 1 indicates the influence of the substance upon the coronary flow and FIGURE 2 the influence upon the blood pressure. The data forming basis of the diagram represent the mean value of the results of measurement ascertained in tests on 8 animals each. The administration of doses higher than 0.8 mg./kg. papaverine is impossible because otherwise a too sharp decrease in blood pressure occurs. The figures show the clear superiority of the hydroxy-coumarin derivative under our invention over the standard substance papaverine which, on the one hand lies in the degree of the influence upon the coronary flow and on the other hand, in the duration of this influence (see FIGURE 1) and, furthermore, they show the difference in the change of blood pressure (see FIGURE 2).

On the same test conditions some further substances of our invention had pharmacologically been tested and the mean values of the test results obtained are indicated in the following table.

For clinical investigation there has been used especially the 3-β-diethylaminoethyl-4-methylcoumarin-7-ethyl oxyacetate chlorhydrate. In various clinics the preparation was addinistered both in the form of dragees and in the form of solutions for intravenous and intramuscular injection in the case of most diversified clinical appearances. The dragees were administered in a dosage of 15–50 milligrams three times daily and the intravenous solution was given in a dosage of 10–20 milligrams once daily. In none of the cases, side-effects of the substance had been observed. The following diagnoses had been made in the patients singled out for these tests: hypercholesterinemia, coronary sclerosis, myocardial infarction, stenocardia, cardiosclerosis, coronary insufficiency and angina pectoris gravis. In practically all of the cases under examination a significant improvement in the state of health of the patients was observed, which led to a complete redress of their pains and complaints.

In the preparation of dragees and tablets containing as active ingredient the 7-hydroxy-coumarin derivatives of our invention, these substances may be admixed with solid tabletting adjuvants, such as starch, lactose, talc and the like. Any of the tabletting materials used in pharmaceutical practice may be employed. For the preparation of the injection solutions there are particularly suited the derivatives of the 7-hydroxy-courmarins being basically substituted since they are water-soluble in the form of their salts. Injection solutions of water-insoluble products may of course be prepared in the conventional manner by concurrently using well-known suspending agents, emulsifiers and/or solubilizers.

| Substance | $LD_{50}$ g./kg. mouse, i.v. | Dosage mg./kg., i.v. | Maximum increase in the coronary flow, percent | Duration of action in minutes | Change in blood pressure, percent |
|---|---|---|---|---|---|
| Papaverine | 0.033 | 0.8 | 24 | 8 | −20 |
| 3-β-diethylaminoethyl-4-methylcoumarin-7-ethyl oxyacetate chlorhydrate | 0.034 | 0.8 | 22 | 60 | +2 |
|  |  | 1.265 | 35 | 60 | +2 |
|  |  | 2.0 | 67 | 75 | −4 |
| 3-β-pyrroidinoethyl-4-methylcoumarin-7-ethyl oxyacetatechlorhydrate | 0.04 | 1.0 | 53 | 26 | ±0 |
| 3-β-piperidinoethyl-4-methylcoumarin-7-ethyl oxyacetate chlorhydrate | 0.016 | 0.2 | 26 | 19 | +2.2 |
|  |  | 0.4 | 37 | 28 | −0.5 |
|  |  | 1.0 | 74 | 50 | ±0 |
| 3-β-morpholinoethyl-4-methyl-coumarin-7-ethyl oxyacetate chlorhydrate | 0.11 | 1.0 | 21 | 16 | ±0 |
| 3-β-piperidinoethyl-4-methyl-7-allyloxycoumarin chlorhydrate | 0.048 | 1.0 | 94 | 30 | +11.3 |
| 3-β-diethylaminoethyl-4-phenylcoumarin-7-ethyl oxyacetate chlorhydrate | 0.02 | 1.0 | 88 | >40 | (¹) |
| 3-[1′,3′-bis-(diethylamino)-isopropyl]-4-methyl-coumarin-7-ethyl-oxyacetate chlorhydrate | 0.058 | 0.8 | 43 | 65 |  |
| 3-β-diethylaminoethyl-4-methyl-coumarin-7-oxyacetic acid β′-aminoethyl-amide |  | 2.0 | 130 | 40 |  |

¹ −15% until 10 minutes after the injection, later ±0%.

Furthermore, comparative tests had been made on the same conditions as described before, however, with intracoronary administration of the following substances and papaverine in equal dosages.

+ = having the same action as papaverine, and
++ = having an action intenser and longer than papaverine.

| Substance | $LD_{50}$ g./kg. mouse, i.p. | Activity |
|---|---|---|
| Papaverine |  | + |
| 4-phenyl-coumarin-7-ethyl oxyacetate | 2.6 | ++ |
| 3-butyl-4-methyl-coumarin-7-ethyl oxyacetate | 0.8 | + |
| 4-methyl-coumarin-7-ethyl oxyacetate |  | + |
| 3-phenyl-4-methylcoumarin-7-isopropyl oxyacetate | >3.0 | + |
| 3-ethyl-4-phenylcoumarin-7-isopropyl oxyacetate | 0.05 | + |
| 3-benzyl-4-methylcoumarin-7-ethyl oxyacetate | 1.1 | + |
| 3-carbethoxy-methyl-4-methyl-5,7-di-(ethyl oxyacetate) | 2.5 | ++ |

The following examples are given for the purpose of characterizing the substances of the present invention. All temperatures given are in degrees centigrade.

*Example 1*

14.3 grams 4-phenyl-7-hydroxy-coumarin (prepared according to the method specified in Org. Synth. vol. 21, page 23 by condensation of benzoylacetic acid ethyl ester with resorcin in concentrated sulfuric acid) are dissolved in 150 ccm. methylethyl ketone and admixed with 10 grams anhydrous potassium carbonate. This mixture is stirred for one hour at 70° and then 13 grams bromoacetic acid ethyl ester and 0.5 grams potassium iodide are added. It is heated until boiling and stirred for 8 hours at the boil. The reaction mixture is filtered off with suction in the heat and the filtrate is concentrated in the vacuum to dryness. The residue is dissolved in methylene chloride, washed several times with diluted sodium hydroxide solution and the solution of methylene chloride is evaporated to dryness. The raw product may be recrystallized from ethyl acetate for further purification. White needles having a melting point of 137–138° are obtained, Yield: 14 grams 4-phenyl-coumarin-7-ethyl oxyacetate (=71.8% of the theory).

*Example 2*

18 grams 3-butyl-4-methyl-7-hydroxy-coumarin (prepared by condensation of α-butylacetic acid ethyl ester with resorcin acording to the method specified in Org. Synth. vol. 21, page 23) are suspended in 200 ccm. methylethyl ketone. 12 grams anhydrous potassium carbonate are added and the mixture is stirred for 1 hour at 70°. Then 0.5 gram potassium iodide is introduced into the reaction mixture and 16 grams bromoacetic acid ethyl ester are allowed to drop in. The mixture is heated until boiling and stirred for 8 hours at the boil. Then the reaction mixture is filtered off with suction in the heat and worked up as indicated in Example 1. The raw product may be recrystallized from ethyl acetate for further purification. The 3-butyl-4-methyl-coumarin-7-ethyl oxyacetate thus obtained forms white needles having a melting point of 78°.

Yield: 20 grams=83.5% of the theory.

*Example 3*

17.6 grams 4-methyl-7-hydroxy-coumarin (prepared by the method indicated in Org. Synth. vol. 21, page 23) are dissolved in 180 ccm. methylethyl ketone and, whilst adding 16 grams anhydrous potassium carbonate, they are allowed to react with 18.5 grams bromoacetic acid ethyl ester according to Example 1. Thus, 4-methyl-coumarin-7-ethyl-oxyacetate having a melting point of 98–100° are obtained.

Yield: 19 grams=72.5% of the theory.

*Example 4*

20 grams 3-phenyl-4-methyl-7-hydroxy-coumarin (prepared by condensation of resorcin with α-phenyl-acetoacetic acid ethyl ester as indicated in J. Chem. Soc. 109, 110 and J. Chem. Soc. 127, 1983) are suspended in 200 ccm. methylethyl ketone and admixed with 20 grams anhydrous potassium carbonate. The mixture is stirred for one hour at 70° and then 15 grams chloroacetic acid tert. butyl ester are allowed to drop in. Subsequently, it is heated until boiling and stirred for another 9 hours at the boil. Now the reaction mixture is filtered off with suction in the heat and the filtrate is concentrated in the vacuum. The residue is dissolved in methylene chloride, the solution is washed for several times with diluted sodium hydroxide solution and, subsequently, the methylene chloride solution is concentrated in the vacuum to dryness. The remaining ray product is recrystallized from benzine.

Yield: 20 grams 3-phenyl-4-methyl-coumarin-7-tert. butyl oxyacetate having a melting point of 113–115° (=69% of the theory).

In an analogous manner, there may be prepared the following 7-oxy-coumarin derivatives:

| Starting materials | | Final product | Melting point | Yield, Percent |
|---|---|---|---|---|
| 3-phenyl-4-methyl-7-hydroxy-coumarin. | Chloroacetic acid-isopropyl ester. | 3-phenyl-4-methyl-coumarin-7-isopropyl oxyacetate. | 138–140° | 70 |
| 3-ethyl-4-phenyl-7-hydroxy-coumarin. | Chloroacetic acid-tert. butyl ester. | 3-ethyl-4-phenyl-coumarin-7-tert. butyl oxyacetate. | 122–123° | 64 |
| Do | Chloroacetic acid-isopropyl ester. | 3-ethyl-4-phenyl-coumarin-7-isopropyl oxyacetate. | 124–125° | 77 |
| 3-benzyl-4-methyl-7-hydroxy-coumarin. | Bromoacetic acid-ethyl ester. | 3-benzyl-4-methyl-coumarin-7-ethyl oxyacetate. | 117–120° | 66 |

*Example 5*

12 grams 3-allyl-4-methyl-7-hydroxy-coumarin are dissolved in 120 ccm. methylethyl ketone and admixed with 12 grams anhydrous poatssium carbonate. This mixture is stirred for 1 hour at 70° and then 11 grams bromoacetic acid ethyl ester are allowed to drop in. Then the mixture is stirred under reflux for another 9 hours. According to the recipe indicated in Example 1, 3-allyl-4-methyl-coumarin-7-ethyl oxyacetate having a melting point of 42–44° is obtained in a good yield.

*Example 6*

18.7 grams 3-β-diethylaminoethyl-4-methyl-7-hydroxy-coumarin chlorhydrate are dissolved in 200 ccm. methylethyl ketone and 18 grams anhydrous potassium carbonate are added. The mixture is stirred for 1 hour at 70° and then 12 grams bromoacetic acid ethyl ester are allowed to drop in. The reaction mixture is stirred under reflux for 9 hours and then it is filtered off with suction in the heat. The filtrate is concentrated in the vacuum to dryness and the resultant residue is dissolved in ether. The etheric solution is washed with diluted caustic soda solution for several times and, subsequently, dried with Glauber's salt. By introduction of hydrochloric acid gas into the etheric solution the reaction product is precipitated in the form of chlorhydrate.

Yield: 15 grams 3-β-diethylaminoethyl-4-methyl-coumarin-7-ethyl oxyacetate chlorhydrate having a melting point of 154–156° (=63% of the theory).

According to the process described in this example there may be prepared in an analogous manner the following compounds of the general formula

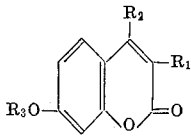

| $R_1$ | $R_2$ | $R_3$ | Melting point of the chlorhydrates |
|---|---|---|---|
| β-diethylaminoethyl | Methyl | Ethyl | 220–222° |
| Do | do | Allyl | 198–201° |
| Do | do | Butyl | 288–290° |
| β-piperidinoethyl | do | Allyl | 220–222° |
| β-diethylaminoethyl | Phenyl | Ethyl oxyacetate. | 158–160° |
| β-piperidinoethyl | Methyl | do | 208–209° |
| β-morpholinoethyl | do | do | 204–205° |
| β-pyrrolidinoethyl | do | do | 182–183° |
| γ-dimethylaminopropyl | do | do | 180–182° |
| 1',3'-bis(diethylamino)-isopropyl | do | do | 176° |

3-β-diethylaminoethyl-4-methyl - coumarin-7-ethyl oxyacetate chlorhydrate described in this example can be saponified to the free acid in a known method by dissolving 4 grams of the chlorhydrate in 40 ccm. water and heating this solution for 4 hours under reflux. When subsequently concentrating the aqueous solution in the vacuum to dryness, a white crystalline residue is obtained which represents the 3-β-diethylaminoethyl-4-methyl-coumarin-7-oxyacetic acid chlorhydrate having a melting point of 70–75°. The yield of the saponification is quantitative.

Example 7

14 grams 3-carbethoxymethyl-4-methyl-5,7-dihydroxy-coumarin (prepared by condensation of phloroglucine with acetylsuccinic acid diethyl ester according to the method indicated in Chemical Abstracts vol. 37, 1430[2] (1943)) are suspended in 200 ccm. methylethyl ketone and 20 grams anhydrous potassium carbonate are added. This mixture is stirred for 1 hour at 70° and then 20 grams bromoacetic acid ethyl ester are allowed to drop in. Then the mixture is heated until boiling and stirred for 9 hours at the boil. The reaction mixture is filtered off with suction in the heat and the filtrate is concentrated in the vacuum to dryness. The residue is dissolved in methylene chloride and washed for several times with diluted caustic soda lye. After drying, the methylene chloride layer is concentrated in the vacuum to dryness and the residual raw product is purified by recrystallization from a mixture of ethyl acetate/benzine (1:1).

Yield: 13 grams 3-carbethoxymethyl-4-methyl-coumarin-5.7-di-(ethyl oxyacetate) having a melting point of 110–112° (=57.5% of the theory).

Example 8

10 grams 3-β-diethylaminoethyl-4-methyl-coumarin-7-ethyl oxyacetate chlorhydrate are stirred together with 75 grams ethylene diamine for about 15 hours at 20–25°. The resultant colorless precipitate is filtered off with suction, washed with water and dried. Thus, 8 grams 3-β-diethylaminoethyl-4-methyl-coumarin-7-oxyacetic acid β'-aminoethylamide are obtained which, after recrystallization from water, are colorless crystals having a melting point of 118–119°.

When using concentrated ammonia instead of ethylene diamine, there is obtained in an analogous manner the 3 - β - diethylaminoethyl-4-methyl-coumarin-7-oxyacetic acid amide in the form of colorless crystals having a melting point of 186–187°.

When using in this example instead of ethylene diamine, one of the following amines, the corresponding amides of the 3-β-diethylaminoethyl-4-methyl-coumarin-7-oxyacetic acid are obtained:

| Amine used | Final product | Melting point |
|---|---|---|
| Asymmetric diethyl-ethylene diamine. | 3-β-diethylaminoethyl-4-methyl-coumarin-7-oxyacetic acid β'-diethylaminoethylamide. | 122–124° |
| Hexamethylene diamine. | 3-β-diethylaminoethyl-4-methyl-coumarin-7-oxyacetic acid ω'-aminohexylamide. | 194° |
| γ-Dimethylamino-propylamine. | 3-β-diethylaminoethyl-4-methyl-coumarin-7-oxyacetic acid-γ'-dimethylaminopropylamide. | 120° |
| Butylamine | 3-β-diethylaminoethyl-4-methyl-coumarin-7-oxyacetic acid butylamide. | 129° |
| α-Amino-pyridine | 3-β-diethylaminoethyl-4-methyl-coumarin-7-oxyacetic acid α'-pyridylamide. | 160–161° |

Example 9

18.7 grams 3-β-diethylaminoethyl-4-methyl-7-hydroxy-coumarin-chlorhydrate are suspended in 280 ccm. methylethyl ketone and, after the addition of 20 grams anhydrous potassium carbonate, the mixture is stirred for 4 hours at 70°. Subsequently, a solution consisting of 9 grams N,N-dimethyl-chloroacetamide in 25 ccm. methylethyl ketone is allowed to drop into the reaction mixture and is stirred for 8 hours at 70°.

After cooling, the solution is filtered off with suction and the filtrate is concentrated in the vacuum to dryness; the residue is dissolved in ethyl acetate and washed for several times with diluted sodium hydroxide solution. The ethyl acetate layer is eliminated and dried. Hydrochloric acid gas is introduced into this solution for precipitating the chlorhydrate of the final product. Thus, 3 - β - diethylaminoethyl-4-methyl-coumarin-7-oxyacetic acid dimethylamide chlorhydrate is obtained having a melting point of 203–206°.

Yield: 14 grams=59% of the theory.

In an analogous manner, there is obtained the 3-β-diethylaminoethyl - 4 - methyl-coumarin-7-oxyacetic acid dibutylamide chlorhydrate having a melting point of 129–130° by allowing 3-β-diethylaminoethyl-4-methyl-7-hydroxy-coumarin-chlorhydrate to react with N,N-dibutyl-chloroacetamide.

It will be understood that this invention is susceptible to further modification and, accordingly, it is desired to comprehend such modifications within this invention as may fall within the scope of the appended claims.

We claim:

1. A compound of the formula

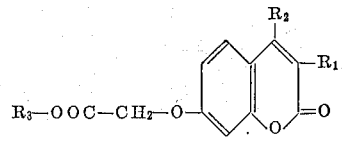

wherein $R_1$ is selected from the group consisting of lower alkyl, phenyl, benzyl and allyl; $R_2$ is selected from the group consisting of lower alkyl and phenyl, and $R_3$ is an alkyl radical having 2–4 inclusive carbon atoms.

2. 4-phenyl-coumarin-7-ethyl oxyacetate having the formula

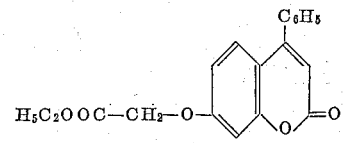

3. 3-butyl-4-methyl-coumarin-7-ethyl oxyacetate having the formula

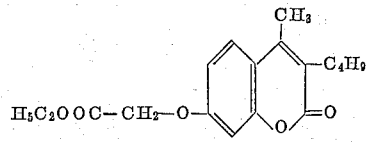

4. 3-phenyl-4-methyl-coumarin-7-tert. butyl oxyacetate having the formula

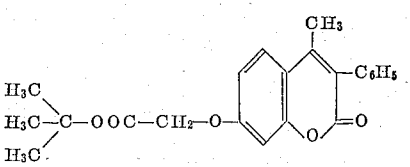

5. 3-phenyl-4-methyl-coumarin-7-isopropyl oxyacetate having the formula

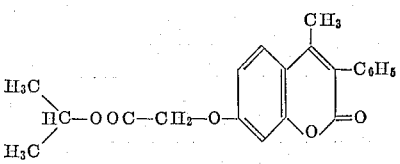

6. 3-ethyl-4-phenyl-coumarin-7-tert. butyl oxyacetate having the formula

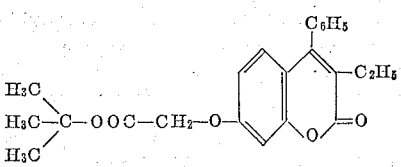

7. 3-ethyl-4-phenyl-coumarin-7-isopropyl oxyacetate having the formula
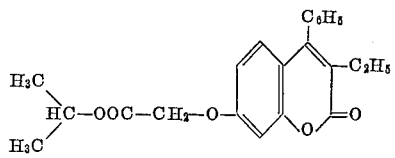
8. 3-benzyl-4-methyl-coumarin-7-ethyl oxyacetate having the formula
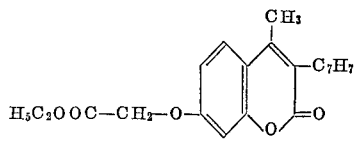
9. 3-allyl-4-methyl-coumarin-7-ethyl oxyacetate having the formula
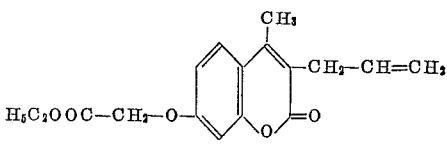
References Cited in the file of this patent
UNITED STATES PATENTS
2,680,746   6/1954   Schappi _____ 260—343.2
WALTER A. MODANCE, *Primary Examiner.*
JOHN D. RANDOLPH, J. A. PATTEN,
*Assistant Examiners.*